US006718143B2

(12) United States Patent
Wijntjes (10) Patent No.: US 6,718,143 B2
(45) Date of Patent: Apr. 6, 2004

(54) HYPER-DENSE WAVELENGTH MULTIPLEXING SYSTEM

(75) Inventor: Geert Johannes Wijntjes, Chelsea, MA (US)

(73) Assignee: Visidyne, Inc., Burlington, MA (US)

( * ) Notice: Subject to any disclaimer, the term of this patent is extended or adjusted under 35 U.S.C. 154(b) by 0 days.

(21) Appl. No.: 10/144,585

(22) Filed: May 13, 2002

(65) Prior Publication Data

US 2003/0016422 A1 Jan. 23, 2003

Related U.S. Application Data

(60) Provisional application No. 60/290,233, filed on May 11, 2001.

(51) Int. Cl.[7] .............................................. H04B 10/06
(52) U.S. Cl. .................. 398/202; 398/188; 398/212
(58) Field of Search ...................... 359/183; 398/188, 398/202, 212; 250/231.16

(56) References Cited

U.S. PATENT DOCUMENTS

| 3,654,473 | A |   | 4/1972  | Nussmeier ............... 359/156 |
|-----------|---|---|---------|----------------------------------|
| 3,752,992 | A |   | 8/1973  | Fluhr ....................... 359/122 |
| 5,098,190 | A | * | 3/1992  | Wijntjes et al. .......... 356/499 |
| 5,134,509 | A | * | 7/1992  | Olshansky et al. ....... 359/132 |
| 5,473,459 | A |   | 12/1995 | Davis ....................... 359/183 |
| 5,606,446 | A |   | 2/1997  | Davis et al. .............. 359/173 |
| 6,046,838 | A |   | 4/2000  | Kou et al. ................ 359/245 |
| 6,111,679 | A |   | 8/2000  | Fishman ................... 359/173 |
| 6,331,059 | B1|   | 12/2001 | Kudryashov et al. ...... 351/221 |
| 2001/0005271 | A1 | | 6/2001 | Leclerc et al. ............ 359/140 |
| 2002/0015208 | A1 | | 2/2002 | Logan, Jr. et al. ........ 359/161 |

FOREIGN PATENT DOCUMENTS

EP          0 898 389 A2    2/1999

OTHER PUBLICATIONS

Swenson, Norman L., *Optical Frequency Division Multiplexing (FDM)*. Jan., 1997, Kestrel Solutions.
Wyntjes, Geert, Byte Wide, *Coherent, Homodyne, High Capacity Fiber Optic Link,* Jan., 1989, OPTRA, Inc.
Wyntjes, Geert, *High–Dynamic Range Phase–Modulated Fiber Optic Link for Microwave Signals.* Jan., 1989, OPTRA, Inc.
Wyntjes, Geert, et al., *Precision Photonic Readout for Cryogenic IR Focal Planes.* May, 1998, Visidyne, Inc.

* cited by examiner

Primary Examiner—Leslie Pascal
Assistant Examiner—Christina Y Leung
(74) Attorney, Agent, or Firm—Iandiorio & Teska (57) ABSTRACT

An improved system and method of decoding a phase modulated encoding of a pair of optical beams is preferably achieved by generating a plurality of optical fringes from the pair of optical beams, sampling each optical fringe and generating a set of at least three phase offset signals from each sampled optical fringe, each generated signal having a unique and known phase difference relative to each sampled optical fringe, and by deriving a quantitative representation of the phase encoding of the pair optical beams from information provided from each set of generated signals. Optionally, the quantitative representation is converted into an electric signal.

16 Claims, 7 Drawing Sheets

HYPER-DENSE WAVELENGTH MULTIPLEXING SYSTEM

RELATED APPLICATIONS

This application claims priority to and incorporates by reference U.S. Provisional Application No. 60/290,233 filed on May 11, 2001 titled HYPER-DENSE WAVELENGTH MULTIPLEXING.

GOVERNMENT LICENSE RIGHTS

This invention was made with Government support under DAAH01-01-C-R169 awarded by the U.S. Army Aviation and Missile Command. The Government has certain fights in the invention.

FIELD OF THE INVENTION

This invention relates to an optical phase modulation encoding and decoding system and method and more particularly to a system enabling transmission of information across an optical communications channel.

BACKGROUND OF THE INVENTION

Fiber optic technology and more specifically an optical channel provides an attractive alternative for transmitting signals. Direct(intensity) modulation is a term that refers to the control of the intensity of an optical beam being emitted from a laser source via the control of the driving current to the laser source. One method of direct (intensity) modulation is dense wavelength division multiplexing (DWDM) where modulation for each channel is baseband, simple on off keying imposed by an interferometric process at 10 Ghz or higher.

The relationship between the driving current and the optical (intensity) amplitude for direct (intensity) modulation is inherently non-linear and limits the (intensity) amplitude of the modulation imposed onto an emitted optical beam. Consequently, the non-linearity of the intensity modulation technique limits the data transmission capacity of this technique and fails to make substantial utilization of the bandwidth of the optical fiber.

Although the use of optical amplifiers with this technique makes optical transmission over very long distances possible, over shorter distances, e.g. through metropolitan areas, this technique uses far less of the potential bandwidth based upon the available signal to noise ratio for an acceptable bit error rate (BER) that is typically available in these circumstances.

SUMMARY OF THE INVENTION

It is therefore an object of this invention to provide a system and method of encoding and decoding phase modulated optical beams that reliably operates at data rates substantially in excess of 100 megabytes per second.

It is a further object of this invention to provide a method of modulating an optical signal beam that operates with substantial linearity between the modulating electrical signal and the emitted and modulated optical signal.

It is a further object of this invention to significantly increase the signaling capacity of a fiber optic link above that provided by current technology in situations where a sufficiently high signal to noise ratio so permits.

It is a further object of this invention to provide a reliable method of transmitting microwave signals over a fiber optic link.

This invention results from the realization that an improved method of encoding and decoding an optical signal can be preferably achieved by phase modulation encoding and transmitting a pair of optical signal beams, and by receiving the pair of optical signal beams and by generating multiple optical fringes (signals) in response to the interference of a pair of phase modulation encoded optical signal beams, sampling each optical fringe and generating a set of at least three phase offset signals in response to and in association with each sampled optical fringe, each phase offset signal having a unique and known phase difference relative to each sampled optical fringe, and by deriving a quantitative representation of the phase modulation encoding of the pair optical signals from each set of phase offset signals and by converting the quantitative representation into an electric signal.

In a preferred embodiment, the phase modulation encoding and decoding system includes and phase modulation encoder and optical transmitter, one or more optical paths, an optical receiver, a multiple fringe generator, a phase sampler and a phase processor.

This invention features hyper-dense wavelength multiplexing system comprising a phase modulation encoding system and a phase modulation decoding system and one or more optical paths for propagating a pair of optical signal beams having a phase modulation.

Preferably, the phase modulation encoding system includes a laser diode that emits an optical signal beam, a divider that divides the optical signal beam into at least two identical optical signal beams, a balanced optical wave guide to modulate the pair of identical optical signal beams and an optical transmitter to transmit the modulated pair of optical signal beams (no longer identical) to an optical receiver via one or more optical paths. Optionally, the optical paths include a fiber optic channel for each modulated optical beam. Optionally, the pair of optical signals are modulated by a Mach-Zehnder modulator.

In some embodiments, the optical phase modulation encoding system may further include a local oscillator and exclude a divider, the local oscillator interoperating with the balanced optical waveguide to modulate one of the pair of optical signals having a phase modulation encoding.

In the preferred embodiment, the optical phase modulation decoding system comprises an optical receiver that receives and outputs a pair of optical signals having a phase modulation encoding, a fringe generator responsive to the pair of optical signals output from the optical receiver configures to generate and output a plurality of optical fringes, a phase sampler responsive to the plurality of optical fringes and configured to generate and output a set of at least three phase offset signals that are sampled from and associated with each optical fringe, each phase offset signal of each set of at least three phase offset signals having a unique and known phase difference relative to the phase of the optical fringe associated with the set of at least three phase offset signals, and a phase processor responsive to each set of at least three phase offset signals and deriving therefrom a quantitative representation of the phase modulation encoding of the pair of phase encoded optical beams.

In some embodiments, the optical phase modulation decoding system may further include a local oscillator that generates one of the pair of optical signals having a phase modulation encoding.

In some embodiments, the fringe generator and the phase sampler comprise a three way coupler. In other embodiments, the fringe generator is configured to interfere the pair of optical signals at a small angle and the phase sampler comprises a detector array or a lenticular screen.

In some embodiments, the phase processor derives the phase modulation encoding of the pair of optical signals by employing ratiometric techniques. Preferably, the quantitative representation of the phase encoding of the pair of optical signals is an electronic signal.

Preferably, the system includes a converter for converting the quantitative representation of the phase modulation encoding of the pair of optical signals and a separator that separates the single aggregate electrical signal into a plurality of sub-carrier electrical signals.

In some embodiments, the receiver comprises a telescope and a Wollaston prism and the pair of optical signals are orthogonally polarized before being transmitted through free space to the telescope from the phase modulation encoding system.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
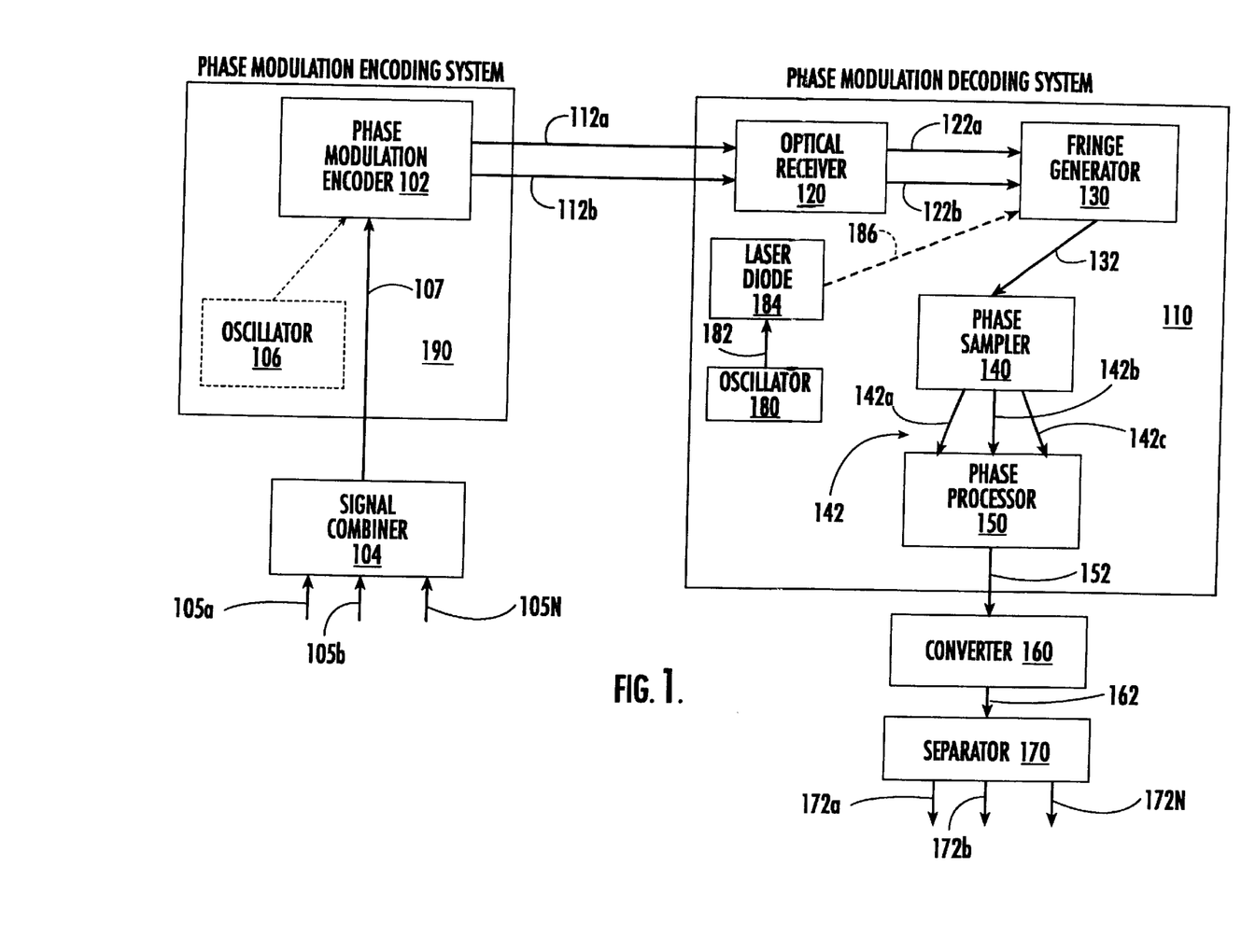
FIG. 1 is a simplified block diagram of a phase modulation encoding and decoding system according to this invention.

FIG. 1 is a simplified block diagram of a preferred phase modulation encoding and decoding system, also referred to as a hyper dense wavelength multiplexing system 100. Hyper dense wavelength multiplexing system 100 in accordance with this invention preferably includes a phase modulation encoding system 190 and a phase modulation decoding system 110. Preferably, a phase modulation encoder 102 is responsive to the output 107 of a signal combiner 104. The signal combiner 104 is configured to combine a number of sub-carrier electrical signals 105a, 105b and 105n into a single aggregate electrical signal 107.

Figure 2:
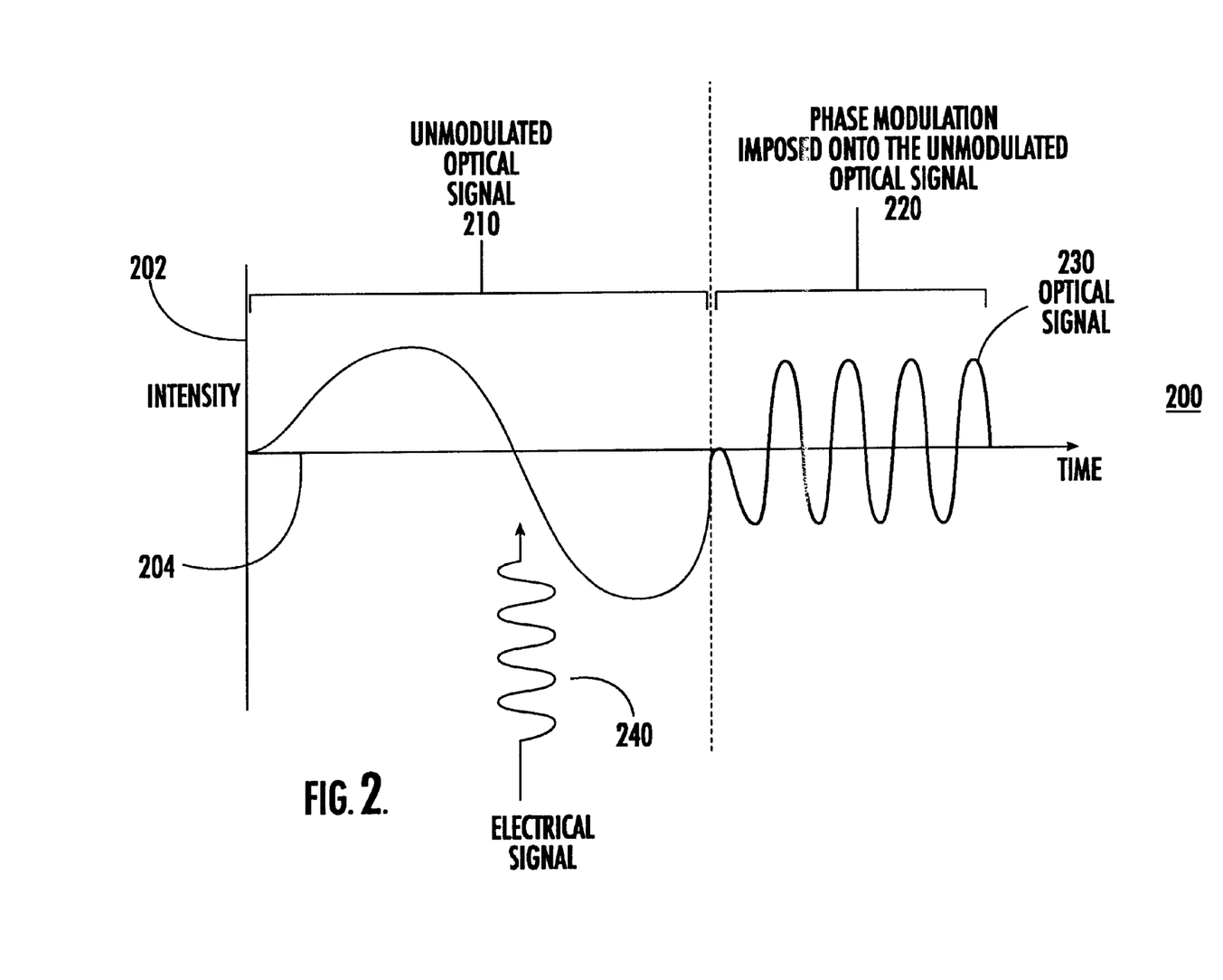
FIG. 2 is an illustration of the phase modulation of an optical signal.

Phase modulation encoder 102 is configured to introduce a phase modulation between two optical signals 112a and 112b that is proportional to single aggregate electrical signal 107 (See FIG. 2). Preferably, there are one or more optical paths as shown which may be one or more optical fibers or cables or even free space for propagating the two phase modulated optical signal beams 112a and 112b. Phase modulation encoder 102 also includes an optical transmitter (not shown) to transmit optical signals 112a and 112b.

Unique optical phase modulation decoding subsystem 110 in accordance with this invention includes optical receiver 120 that receives optical beams 112a and 112b that have the phase modulation encoding and outputs a pair of optical beams 122a and 122b. In some embodiments, optical signals 122a and 122b will be amplified by receiver 120. In other embodiments, optical signals 122a and 122b will be equivalent to optical signals 112a and 112b respectively. Preferably, a homodyne 3-port receiver is used to receive optical signals 112a and 112b that preferably propagate at the same frequency when unmodulated.

Fringe generator 130 is responsive to the pair of optical signals 122a and 122b that are output from optical receiver 120 and is configured to generate and output a plurality of optical fringes 132.

Phase sampler 140 is responsive to the plurality of optical fringes 132 that are output from fringe generator 130 and is configured to generate and output a set 142 of at least three phase offset signals 142a, 142b, and 142c sampled from and associated with each optical fringe. Each signal 142a, 142b, and 142c of each set 142 of phase offset signals has a unique and known phase difference relative to the phase of the sampled optical fringe associated with the set 142 of phase offset signals. In some embodiments, the set 142 of the at least three phase offset signals 142a, 142b, and 142c are optical. In other embodiments, the set 142 of the at least three phase offset signals 142a, 142b, and 142c are electrical.

Phase processor 150 is responsive to the three phase offset signals 142a, 142b, and 142c and is configured to derive therefrom a quantitative representation 152 of the phase encoding of the pair of phase encoded optical beams 112a and 112b.

The preferred embodiment includes an optical receiver 120, a fringe generator 130, and phase sampler 140 which are collectively responsive to the two phase modulated optical signal beams 112a and 112b and configured to generate at least three fringe signals 142a, 142b, and 142c each having the phase modulation of an associated fringe offset by a unique and known phase difference relative to the other two fringe signals.

Phase processor 150 receives the at least three fringe signals 142a, 142b and 142c and derives therefrom the phase modulation introduced by phase modulation encoder 102. Phase processor 150 derives and outputs a quantitative representation 152 of the phase modulation imposed by phase modulation encoder 102.

In the preferred embodiment, quantitative representation 152 is an electrical signal that represents an 8 bit or larger quantity encoded into one modulation time window. A modulation time window is that window in time required for phase modulation encoder 102 to encode a value. In the preferred embodiment, the modulation time window is the time required to encode an 8-bit binary quantity ranging from the value 0 to 255. For example, when communicating a megabyte per second, one millionth of a second would be required to encode and transmit an 8-bit value (1 byte). The phase modulation of each optical fringe is equivalent to the phase modulation imposed by the phase modulation encoder 102 onto the optical signals 112a and 112b within a modulation time window.

Preferably, phase modulation decoding system 110 includes a converter 160 that converts the quantitative representation 152 of the derived phase modulation of the pair of optical signals 112a and 112b into a single aggregate electrical signal 162. Furthermore, the phase modulation decoding system 110 preferably includes a separator 170 that separates the single aggregate electrical signal 162 into multiple sub-carrier electrical signals 172a, 172b, and 172n. Multiple sub-carrier electrical signals 105a, 105b and 105n are equivalent to the multiple sub-carrier electrical signals 170a, 170b and 170n.

In one embodiment, optical phase modulation decoding system 110 includes an oscillator 180 and a laser diode 184, such as a YAG chip laser, that generates one of the pair of optical beams 112b having a phase modulation encoding. The optical signal beam 112a is phase modulated by the phase modulation encoder 102 using the transmitter oscillator 106 local to the phase modulation encoder 102. Both the oscillator 106 and the oscillator 180 operate, and are required to operate, synchronously.

In some embodiments, optical signal beams 112a and 112b are transmitted through free space. In this type of an embodiment, phase modulation encoder 102 includes an optical beam expander 814, FIG. 8A and optical receiver 120 includes a telescope 820, FIG. 8B. The pair of optical signal beams 112a and 112b are orthogonally polarized (e.g. linearly or left and right handed circular, offset by 90 degrees in time from each other) before being transmitted through free space to the optical receiver 120.

Figure 3:
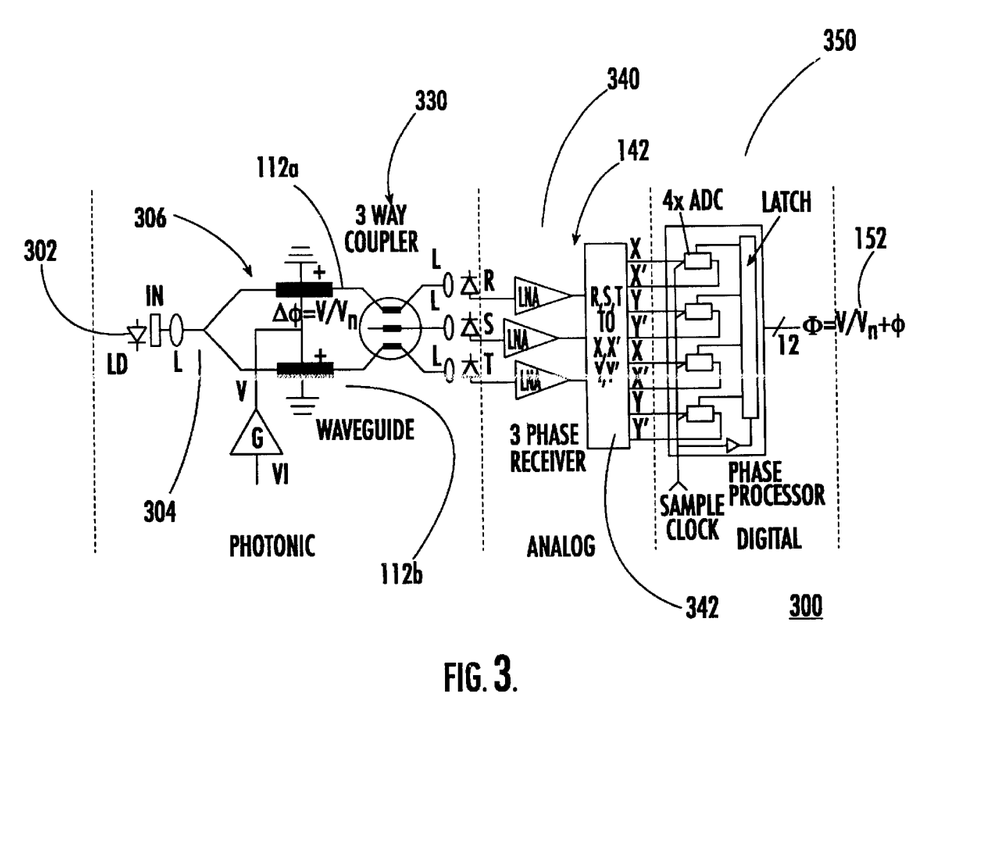
FIG. 3 is a simplified block diagram depicting a three-way coupler and related components according to one embodiment of this invention.

In the preferred embodiment of the fringe generator 130 of the system 110 is a 3-way coupler 330, FIG. 3. In this embodiment, the 3-way coupler operates as both a fringe generator 130 and as phase sampler 140. The 3-way coupler internally generates a plurality of optical fringes and outputs one set 142 of three phase offset signals 142a, 142b and 142c for each generated optical fringe. The 3-way coupler does not generate an optical fringe pattern like that processed by a detector array or a lenticular screen in other embodiments.

In other embodiments, optical fringes are generated by interfering optical signals 122a and 122b at a small angle (for example, 1.5 degrees) generating a spatial fringe pattern. For this type of embodiment, phase sampler 140 can include a lenticular screen 440, FIG. 4 and the phase processor 150 includes a series of high speed diode detectors 452, FIG.4 that are utilized to convert phase sampled optical signals refracted by the lenticular screen 440 into electrical signals.

In some embodiments the phase processor derives the phase modulation encoding of the pair of optical beams 112a and 112b by employing ratiometric techniques as discussed with reference to FIG. 6.

In some embodiments quantitative representation 152 of the pair of phase encoded optical signal beams 112a and 112b is an electronic signal 152. In some embodiments the system 110 includes a converter 160 for converting the quantitative representation 152 of the phase encoding into a single aggregate electrical signal 162. Furthermore the system 110 includes a separator 170 for separating the single aggregate electrical signal 162 into a plurality of sub-carrier electrical signals 172a, 172b, and 172n.

In the preferred embodiment, phase modulation encoder 102 includes a laser diode 302, FIG. 3, an optical signal divider 304, FIG. 3, a balanced optical waveguide 306, FIG. 3 and an optical transmitter (not shown). The laser diode 302, FIG. 3 emits an optical signal beam that is divided into a pair of two identical optical signal beams by the optical signal divider 304, FIG. 3. The balanced optical waveguide 306, FIG. 3 imposes a (push/pull) phase modulation upon the pair of identical optical signal beams. The optical transmitter (not shown) transmits the pair of optical signal beams having the imposed phase modulation 112a and 112b (not shown) to the optical receiver 120.

Figure 8A:
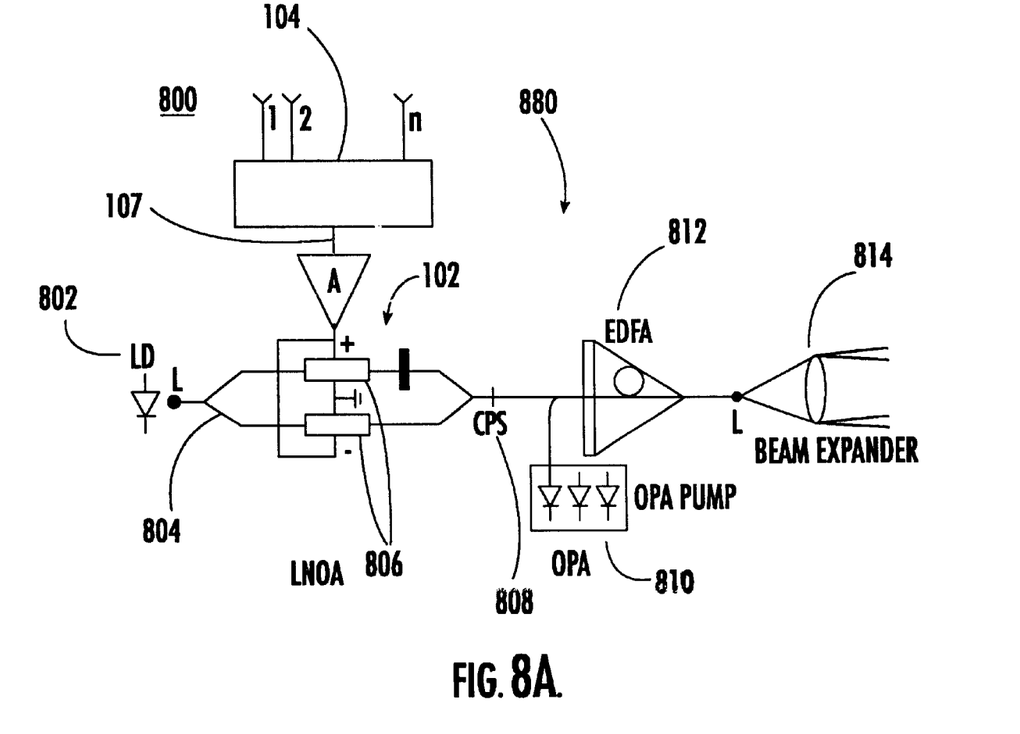
FIG. 8A is a simplified block diagram depicting a free space transmitter design.
Figure 8B:
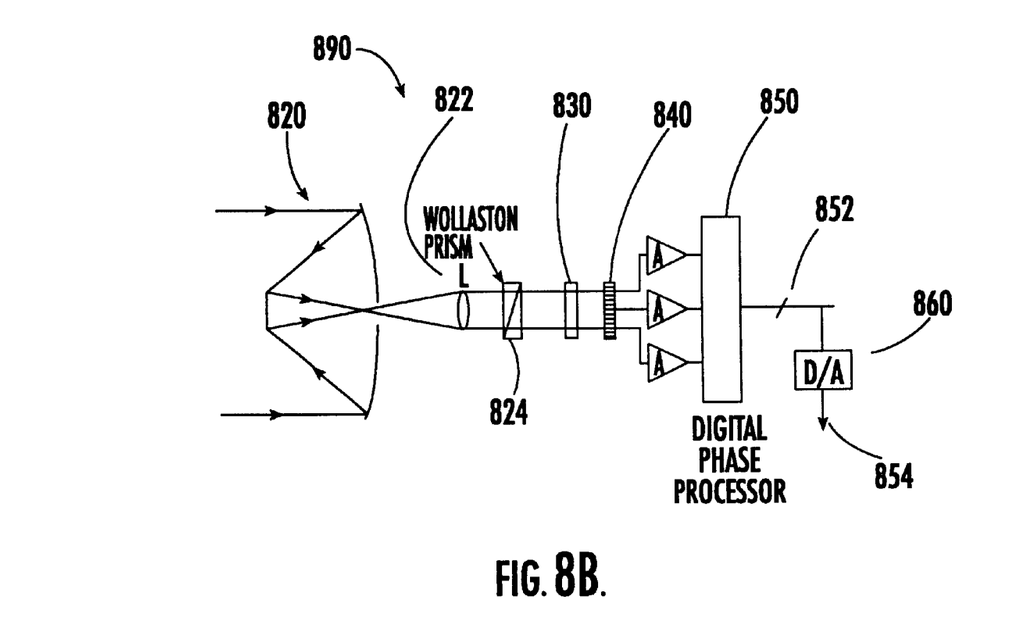
FIG. 8B is a simplified block diagram depicting a free space receiver design.

In one particular embodiment, phase modulation encoder 102 includes a Mach-Zehnder balanced optical waveguide (modulator). For embodiments where the optical signal beams 112a and 112b are transmitted through free space, such as through the atmosphere or outer space, the pair of optical signal beams are orthogonally polarized and optical receiver 120 includes a Wollaston prism (FIGS. 8A and 8B).

FIG. 2 is an illustration of a phase modulation imposed onto an optical signal 230. Optical signal 230 has unmodulated portion 210 and modulated portion 220. The optical signal 230 is represented on a graph including a vertical axis 202 and a horizontal axis 204. The vertical axis 202 represents the optical intensity of the optical signal. The horizontal axis 204 represents the passage of time. Hence, the graph illustrates the optical signal intensity of the optical signal 230 over time.

Phase modulation 220 is imposed onto the optical signal 230 by applying an input voltage 240 to a balanced optical wave guide within the phase modulation encoder 102, FIG. 1. Note that the modulated portion 220 of the optical signal 230 typically contains the combination of a fractional cycle plus zero, one or more whole cycles. The modulated portion 220 of the optical signal 230 can be expressed as a whole number plus a fractional number of cycles, for example 3¾ cycles. The fractional number of cycles can also be expressed in terms of radians where $2\pi$ radians=1 cycle. The modulated portion 230 resides inside on time modulation window. Preferably, the un-modulated portion 210 of the two optical signals 112a and 112b propagate at the same frequency.

In some embodiments, "push/pull" phase modulation can be employed to add frequency to one signal 112a while reducing frequency of the other signal 112b within a time modulation window.

FIG. 3 is a simplified block diagram 300 depicting three way coupler 330 and related components according to one embodiment of this invention. In this embodiment, three way coupler 330 acts as both a fringe generator 130 and as a phase sampler 140. The fringe generator portion of the three way coupler functionality, through control of coupling ratios, internally generates multiple electrical fields each representing an optical fringe signal resulting from the interference of the pair of optical signal beams 112a and 112b.

The three way coupler 330 also generates a set of at least three additional electical fields, the set of additional electric fields being associated with one electical field that represents one optical fringe signal, each electical field of the set having a predetermined, unique, stable and known phase offset from the electical field associated with the set. Three way coupler 330 outputs a set of three electrical phase offset signals (R, S, T) 142. Each electrical phase offset signal 142a, 142b or 142c corresponds to one electrical field having a predetermined, unique and known phase offset from each electrical field representing optical fringe. Three way coupler 330 does not generate an external spatial fringe pattern like some other types of fringe generators. Information regarding the operation of a 3-way coupler is provided by "Phase Diversity Techniques for Coherent Optical Receivers" A. W. Davis, M. J. Pettitt, J. D. King and S. Wright, IEEE, 1987) and is incorporated by reference.

Three phase receiver 340 amplifies the set 142 of three electrical phase offset signals (R, S, T) 142a, 142b and 142c that are output from the three way coupler 330 into three amplified electrical phase offset signals 142a, 142b and 142c. Three phase receiver 340 includes three low noise amplifiers (LNA) and an optional three phase to four phase converter 342. Three phase receiver 340 transfers these three amplified electrical phase offset signals 142a, 142b and 142c to the three phase to four phase converter 342. The three phase to four phase converter 342 inputs the three phase offset values and outputs four phase offset values (90 degrees apart) from each other.

Phase processor 350 inputs four phase offset values (90 degrees apart) from each other and derives a quantitative representation 152 of the phase encoding of the pair of phase encoded optical beams 112a and 112b. The three phase to four phase converter 342 is an optional, and not a required component of the invention.

In this embodiment, a specific embodiment of a phase processor 350 includes a series of four analog to digital converters (ADC) which are electronically coupled to a latch. The phase processor 350 also includes a sample clock electronically coupled to each analog to digital converter. The phase processor outputs a quantitative representation 152 of the phase encoding of the pair of phase encoded optical beams 112a and 112b.

In other embodiments, the three electronic phase offset signals 142a, 142b and 142c are transferred directly from the three phase receiver 340 to the phase processor 350 without conversion from three to four phases. In these embodiments, the phase processor 150, FIG. 1 is configured to process three phase off signals.

Figure 4:
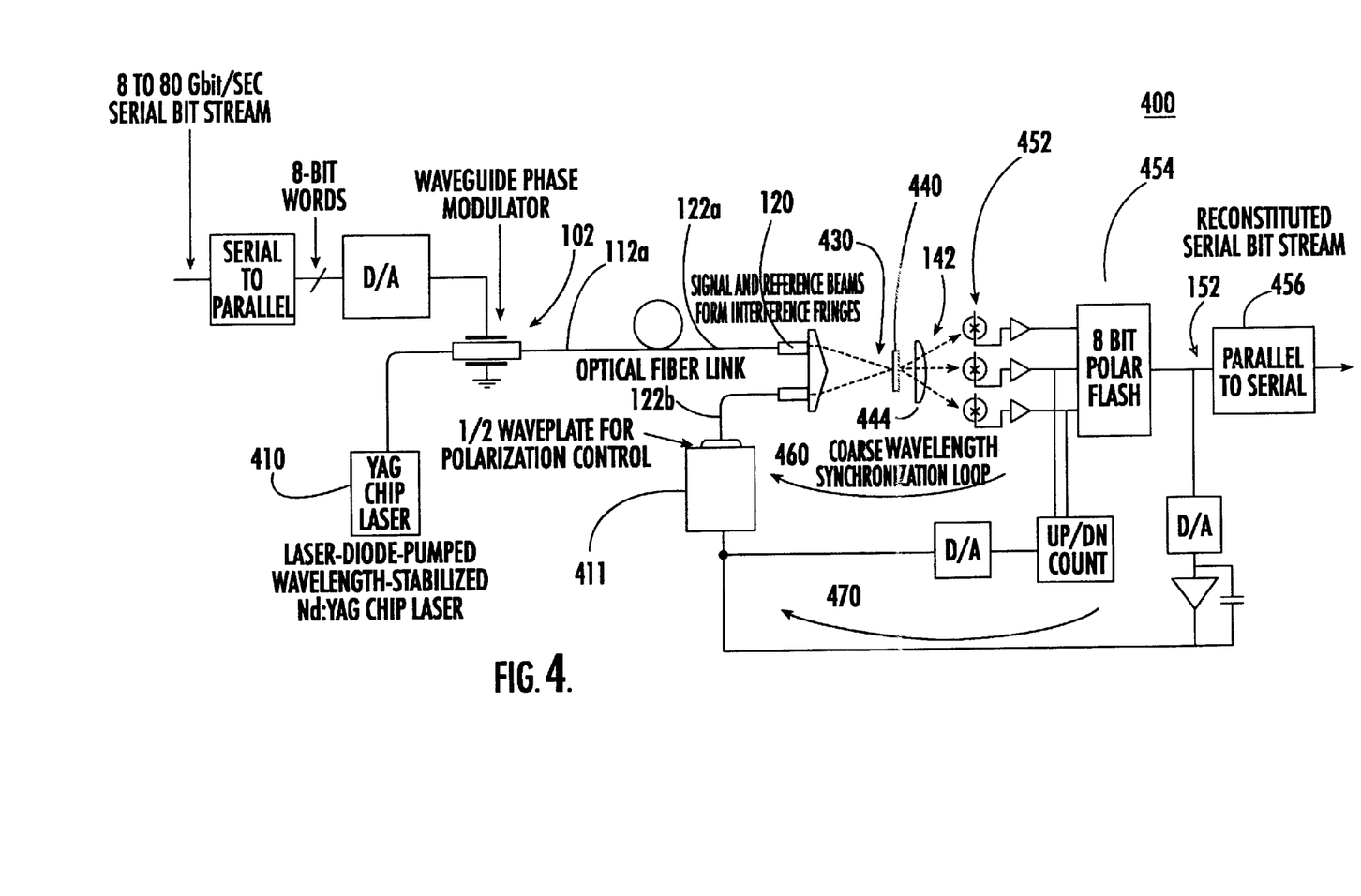
FIG. 4 is a simplified block diagram depicting the generation of a spatial fringe pattern according to one embodiment of this invention.

FIG. 4 is a simplified block diagram depicting generation of a spatial fringe pattern 430 according to one embodiment of this invention. In this embodiment, two optical signals 122a and 122b are interfered at a small angle (approximately 1.5 degrees) to generate a spatial optical fringe pattern 430 including a plurality of optical fringes.

In this embodiment, phase sampler 140 is lenticular screen 440. The lenticular screen 440 phase samples each optical fringe of the optical fringe pattern 430 and propagates a set 142 of three optical phase offset signals 142a, 142b, 142c as input into the phase processor 150, FIG. 1. Each optical phase offset signal 142a, 142b, 142c having a pre-determined, unique and known phase difference relative to each phase sampled optical fringe associated with the set 142 of optical phase offset signals. Optionally, a lens 444 can be disposed between the lenticular screen 440 and the high speed diode detectors 452 to direct light in a predetermined manner.

In this embodiment, the phase processor 150 includes a set of high speed PIN diode detectors 452 electronically coupled to an eight bit Polarflash component 454 which is electronically connected to a parallel to serial converter 456. The Polarflash component 454 is a specific embodiment of a component that converts the set 142 of three electronic phase offset signals output from the PIN diode detectors 452 into an 8-bit digital quantitative value 152.

Optical beam 122a is transmitted from YAG chip laser 410 within phase modulation encoder 102, FIG. 1. Optical beam 122b originates from YAG chip laser 411 operating within phase modulation decoder 110, FIG. 1. Coarse wavelength synchronization loop 460 and fine wavelength synchronization loop 470 are employed to synchronize the operation of YAG chip laser 411. YAG chip laser is responsive to the local oscillator 180 (FIG. 1).

Figure 5:
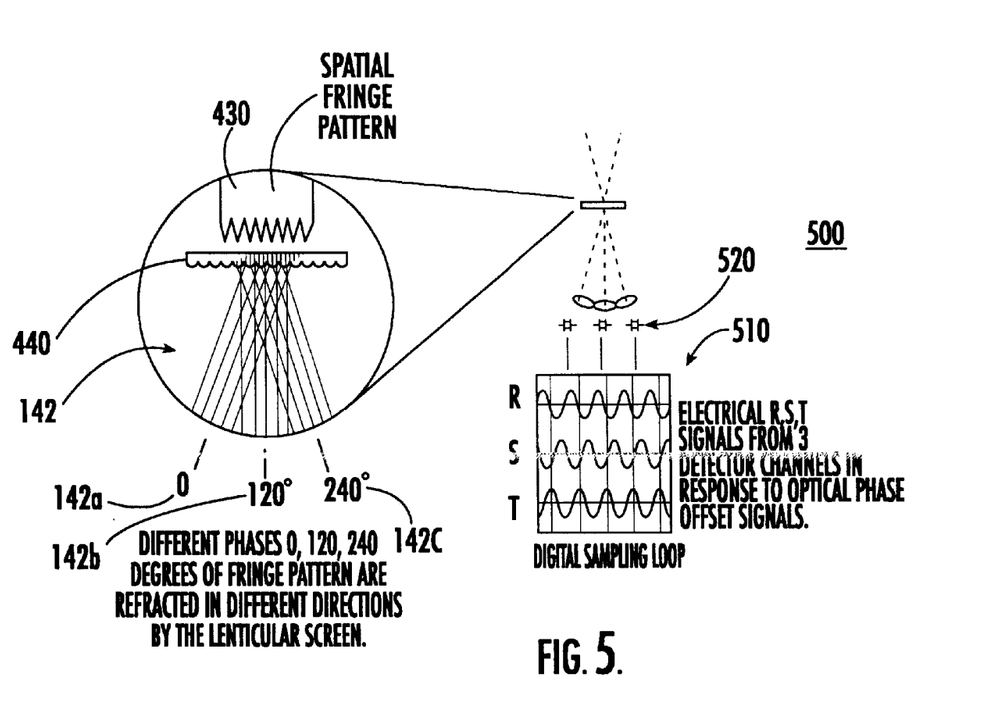
FIG. 5 is a simplified block diagram depicting the operation of a lenticular screen according to one embodiment of this invention.

FIG. 5 is a simplified block diagram depicting the operation of a lenticular screen 440 according to one embodiment of this invention. Spatial fringe pattern 430, FIG. 4 preferably generated by interfering two optical signal beams 122a and 122b at a small angle, is propagated onto a lenticular screen 440.

A spatial optical fringe pattern, typically consisting of approximately 100 fringes is phase sampled (sliced) by a lenticular screen 440 that directs (refracts) three optical phase offset signals, each optical phase offset signal being phase offset 120° relative to each phase sampled optical fringe to a phase processor 150. The spatial optical fringe pattern travels, e.g. up and down or left to right, one spatial cycle for each cycle of phase introduced by the phase modulation. The optical fringes move in a direction that is indicative of whether the phase between the interfered two optical signal beams increases or decreases. These three optical phase offset signals are nearly identical (as refracted from the spatial filtering effect of the lenticular screen) except for the 120° relative phase offset difference between them.

The lenticular screen 440 generates a set 142 of three optical phase offset signals (R, S, T) 142a, 142b, and 142c having a pre-determined, unique and known phase difference relative to each phase sampled optical fringe of the generated spatial optical fringe pattern that is associated with the set of optical phase offset signals 142.

The graph 510 depicting the intensity over time of the set 142 optical phase offset signals (R, S, T), is shown. A set 520 of three detector channels converts the of the set 142 optical phase offset signals (R, S, T ) into a set of electrical phase offset signals (R, S, T). The amplitude over time graph 510 shows the phase of each electrical phase offset signal. In this illustration the relative phase offset differences between optical and electrical signals (R, S, T) are 120° apart.

Optical fringes move (travel) one spatial cycle for each cycle of phase shift between the pair of optical signal beams 112a and 112b i.e. V=2V$_x$. Spatial frequency of lenticular screen (omega)=1000 cm$^{-1}$ (10 micron fringes). Fringe velocity on the screen for f$_m$=1 GHz and VN$_z$=5 cycles; V$_{max}$=2πf$_m$5/a=3×10$^7$ cm/sec (Mach 1000).

The phase sampler 140 samples (slices) of each optical fringe 120° apart to arrive at 3 phase offset signals. For example, there are typically from 50 to 100 optical fringes. Phase offset signals (R, S, T) are modeled as follows:

$$\left. \begin{array}{l} R = I_{DC} + L_v \cos\Phi \\ S = I_{DC} + L_v \cos\Phi + 2\pi/3 \\ T = I_{DC} + L_v \cos\Phi - 2\pi/3 \end{array} \right\} + (RIN)I_{DC} \quad (1)$$

There are 3 unknowns, $I_{DC}$, $L_v$, and the desired phase $\Phi$ and the 3 equations, can therefore solve for $\Phi$. $I_{DC}$ is the unmodulated optical intensity of the phase modulation encoder 102. $I_v$ is the range of peak to peak optical intensity imposed upon the unmodulated optical signal by the phase modulation encoder 102. $\Phi$ is the phase angle of the sampled phase offset signal at an instant in time.

$$A=R-S/T-S, \ B=S-T/R-T, \text{ and } C=T-R/S-R \quad (2)$$

Measurement of R, S and T leads to the elimination of $I_{DC}$, $L_y$. To some extent (RIN) $I_{DC}$ can be correlated it as well.

Figure 6:
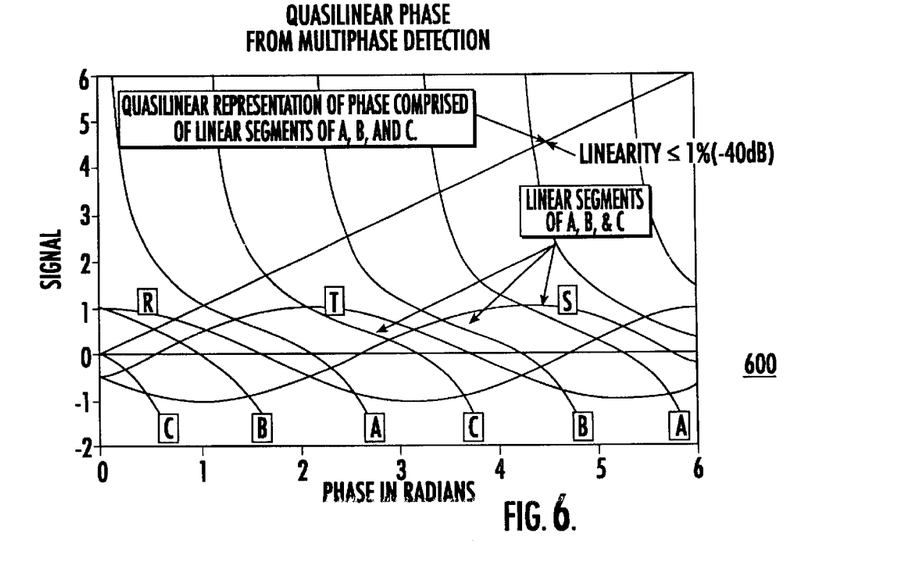
FIG. 6 is an illustration of a quasilinear representation of signal phase.

FIG. 6 is an illustration of a quasi-linear representation of signal phase comprised of linear segments A, B, C. Signals R, S, and T are shown to be approximately 120° offset in phase from each other. Linear segments A, B, and C are drawn in relation to signals R, S, and T. The values A, B, and C in combination with R, S, and T are used as input to a ratiometric calculation of the actual phase modulation encoded value of optical beams signals 112a and 112b.

By computing ratios A, B, and C, a nearly linear measure, to $\leq -40$ dB of phase intensity are obtained. The range of phase values each covering a sextant (60°) are then stitched together to cover the full 360°. In some embodiments, the ratios (A, B, C) are computed using a set of (6) flash A-D converters. Phase unwrapping (whole cycle counting) is accomplished by a digital phase lock-loop that tracks and counts the whole phase cycles.

Figure 7:
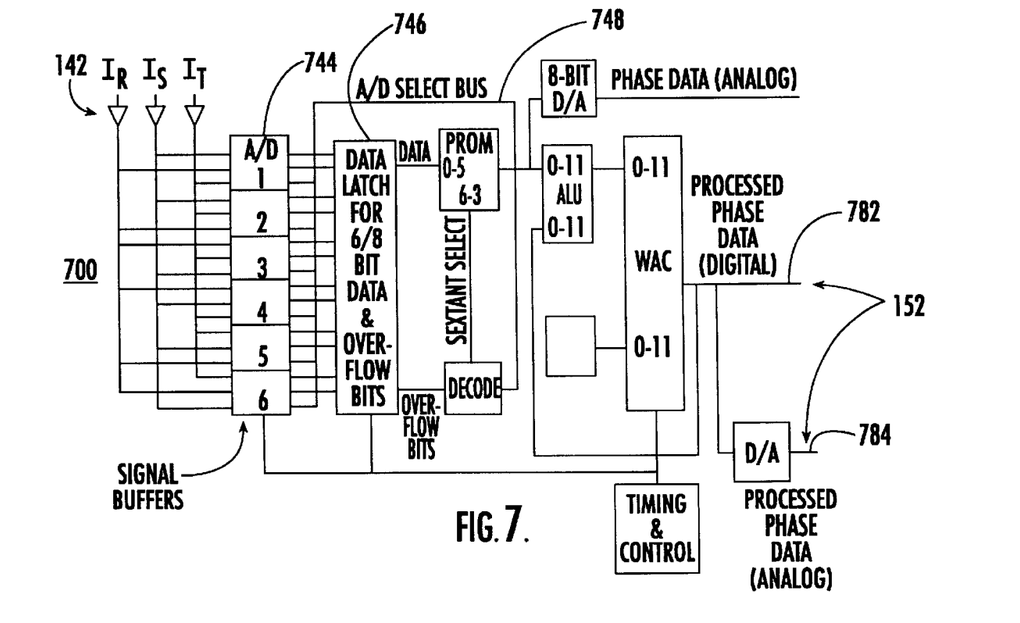
FIG. 7 is a simplified block diagram depicting a phase linearization circuit.

FIG. 7 is a block diagram depicting one embodiment of a phase linearization circuit 700. The phase linearization circuit 700 inputs a set of 3 electrical phase offset signals 142 and outputs a quantitative representation 152 as digital data 782 or analog data 784. The phase linearization circuit 700 includes signal buffers 744, a data latch for data and overflow bits 746, and an A/D select bus 748 among other components shown in FIG. 7.

FIG. 8A is a simplified block diagram depicting a free space phase modulation encoding 880. The free space phase modulation encoding system 880 comprises a signal combiner 104 that outputs an aggregate electronic signal 107 into a phase modulation encoder 102. In this embodiment, the phase modulation encoder 102 includes a laser diode (LD) 802 that outputs an unmodulated optical signal that is separated into two identical unmodulated optical signals by a divider 804. A (balanced) waveguide phase modulator 806 imposes a phase modulation upon the pair of two unmodulated optical signals 112a and 112b.

The free space optical transmitter 810 also comprises, a quarter waveplate element (CPS) 808 to convert the two linear polarized optical signal beams into circular polarized optical signal beams, an optical fiber amplifier (OPA) 810, an erbium doped fiber amplifier (EDFA) 812 and beam expander 814. The pair of two optical signals 112a and 112b, FIG. 1, now having a phase modulation, are orthogonally polarized before being transmitted through free space, inside or outside the Earth's atmosphere, towards the free space optical receiver 890.

FIG. 8B is a simplified block diagram depicting a free space phase modulation decoding system 890. The free space phase modulation decoding system 890 includes a telescope 820 as an optical receiver 120, a lens (L) 822, a polarization phase diversity receiver 824 including a Wollaston prism, a polarizer 830, detector array 840, and a phase processor 850. In this embodiment, the specific embodiment of the phase processor 150 is a digital phase processor 850. The quantifiable representation 152 is a digital electronic signal output 852 of the digital phase processor 850. The digital electronic signal output 852 is converted into analog electronic signal 854 via a digital to analog converter 860.

This embodiment FIGS. 8A and 8B can be employed as a high capacity optical laser communications downlink from a satellite transmitter to a ground receiver. This approach can accommodate a large aggregate number of channels, >100, that can be allocated in terms of bandwidth and signal-to-noise ratio with flexibility and that are collectively transmitted as single very wide, linearly deviated optical modulation carrier.

The design is unique in that it overcomes a basic limitation of existing modulation schemes used for optical links, these have a poor trade-off between link signal-to-noise and therefore capacity and channel crosstalk from intermodulation products due to nonlinearities in the modulation process.

The overall concept for the downlink is shown in FIGS. 8A and 8B. It comprises an optical photonic low noise optical amplifier, LNOA, essentially an optical parametric amplifier (not shown), including balanced pair of optical waveguides 802. An aggregate number of sub-carriers with a range of center frequencies and with different modulation formats, analog or digital and with different bandwidths depending on need, the sum of which then linearly deviates the phase between a pair of optical carriers over a range of $\geq \pm 2$ cycles at frequencies $>10$ GHz.

Because of the brightness of the source, a low power laser diode at a wavelength $\lambda=1550$ nm and the high impedance of the modulator there is, depending on bandwidth, a great deal of power gain from the modulator at a power level of $\approx 75$ mwatt each, are then coded as two distinct e.g., linear polarizations and amplified by an optical power amplifier (OPA) in the form of an erbium doped fiber amplifier (EDFA) supplied by a laser diode array and producing upwards of one watt of optical power. These coded beams with a phase or frequency difference between them are projected to the ground within some solid angle commensurate with the pointing ability of the satellite. These totally common mode beams, subject to the same atmosphere in terms of turbulence, losses and Doppler are received, by a ground based telescope of 1 to 3 meter size.

The polarizations are then separated by e.g., a Wollaston (W) prism and in next step interferred, via a polarizer, P on to a phase diversity receiver, a detector that produces, three or more e.g., four, phased samples of the interference signal and separated by 120°, ⅓ cycle or 90°, ¼ cycle.

A very high speed digital phase processor then recovers the original aggregate signal as a digital binary weighted number $\Phi_t = \Phi_{min}^{(2n-1)} + 2^{(m-1)}$, as a fractional fringe and a cycle count or as analog representation $V^\circ \alpha V_t(t)$. The original assigned frequency bands can then be separated by suitable electronic filters and further decided for different users. In principle, and mostly in practice the whole process of encoding as a phase modulation and decoding the phase modulation is linear and therefore, to first approximation fee from intermodulation products (noise between channels). This benefit greatly reduces the cost of a tradeoff between channel count and signal-to-noise ratio, and therefore link capacity.

This approach is capable of transferring vast amounts data from space of which to the ground based users. The advantages include better performance, signal-to-noise, link capacity for the same transmitter power, potentially at the cost of greater demands on acquisition and pointing. Other advantages are a high degree of security and freedom from FCC frequency allocation limits.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An optical phase modulation decoding system comprising:
   an optical receiver that receives and outputs a pair of optical signals having phase modulation encoding;

a fringe generator responsive to the pair of optical signals output from the optical receiver and configured to generate and output a plurality of optical fringes;

a phase sampler responsive to the plurality of optical fringes and configured to generate and output a set of at least three phase offset signals that are sampled from and associated with each optical fringe, each phase offset signal of each set of at least three phase offset signals having a unique and known phase difference relative to the phase of the optical fringe associated with the set of at least three phase offset signals; and a phase processor responsive to each set of at least three phase offset signals and deriving therefrom a quantitative representation of the phase modulation encoding of the pair of phase encoded optical signals.

2. The system of claim 1 further including a local oscillator and wherein one of the pair of optical signals having a phase modulation encoding is generated by the local oscillator.

3. The system of claim 1 wherein the receiver comprises a telescope and where the pair of optical signals are orthogonally polarized before being transmitted through free space to the telescope.

4. The system of claim 1 where the fringe generator and the phase sampler include a three way coupler.

5. The system of claim 1 wherein the fringe generator is configured to interfere the pair of optical signals at a small angle and wherein the phase sampler comprises a detector array.

6. The system of claim 1 wherein the fringe generator is configured to interfere the pair of optical signals at a small angle and wherein the phase sampler comprises a lenticular screen.

7. The system of claim 1 wherein the phase processor derives the phase modulation encoding of the pair of optical signals by employing ratiometric techniques.

8. The system of claim 1 wherein the quantitative representation of the phase encoding of the pair of optical signals is an electronic signal.

9. The system of claim 1 further including a converter for converting the quantitative representation of the phase modulation encoding of the pair of optical signals into a single aggregate electrical signal.

10. The system of claim 9 further including a separator configured to separate the single aggregate electrical signal into a plurality of sub-carrier electrical signals.

11. The system of claim 1 wherein the pair of optical signals are modulated by a balanced optical wave guide prior to being received by the optical receiver.

12. The system of claim 1 wherein the pair of optical signals are modulated by a Mach-Zehnder modulator.

13. The system of claim 1 wherein the pair of optical signals are orthogonally polarized before being received by the optical receiver and where the optical receiver comprises a Wollaston prism.

14. A hyper-dense wavelength multiplexing system comprising:

a signal combiner configured to combine a number of sub-carrier electrical signals into a single aggregate electrical signal;

a waveguide modulator configured to introduce a phase modulation between two optical beams proportional to the single aggregate electrical signal;

one or more optical paths for propagating the two phase modulated optical beams;

a receiver responsive to the two phase modulated optical beams and configured to generate at least three interference signals each having the phase modulation introduced by waveguide modulator and each having a known fixed phase difference between the other two interference signals;

a phase processor configured to receive the three interference signals and to derive therefrom the phase modulation introduced by waveguide modulator; and a converter for converting the derived phase modulation into the single aggregate electrical signal and to separate the single aggregate electrical signal into the sub-carrier electrical signals.

15. The system of claim 14 in which the receiver includes means for optically combining the two phase modulated optical beams to produce an interference signal and at least three detectors which sample the interference signal at three different locations to produce the three interference signals.

16. The system of claim 14 in which the optical paths include an optical fiber for each modulated optical beam.

* * * * *

UNITED STATES PATENT AND TRADEMARK OFFICE
CERTIFICATE OF CORRECTION

| | | |
|---|---|---|
| PATENT NO. | : 6,718,143 B2 | Page 1 of 1 |
| APPLICATION NO. | : 10/144585 | |
| DATED | : April 6, 2004 | |
| INVENTOR(S) | : Geert J. Wijntjes | |

It is certified that error appears in the above-identified patent and that said Letters Patent is hereby corrected as shown below:

Column 1 of the Specification, from line 12 to line 15 which reads "This invention was made with Government support under DAAH01-01-C-R169 awarded by the U.S. Army Aviation and Missile Command. The Government has certain fights in the invention.", should read --This invention was made with Government support under DAAH01-03-C-R-195 awarded by the U.S. Army Aviation and Missile Command. The Government has certain rights in the invention.--

Signed and Sealed this

Sixteenth Day of June, 2009

JOHN DOLL
*Acting Director of the United States Patent and Trademark Office*